United States Patent
Fujimura et al.

(10) Patent No.: US 8,828,622 B2
(45) Date of Patent: Sep. 9, 2014

(54) SEPARATOR FOR FUEL CELL AND MANUFACTURING METHOD OF THE SAME

(75) Inventors: Shirou Fujimura, Miyoshi (JP); Takuma Watanabe, Anjo (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 481 days.

(21) Appl. No.: 12/947,995

(22) Filed: Nov. 17, 2010

(65) Prior Publication Data

US 2011/0123904 A1 May 26, 2011

(30) Foreign Application Priority Data

Nov. 26, 2009 (JP) ................................. 2009-268963

(51) Int. Cl.
*H01M 8/04* (2006.01)
*B21D 22/00* (2006.01)
*H01M 8/02* (2006.01)
*H01M 8/10* (2006.01)

(52) U.S. Cl.
CPC ...... *H01M 8/026* (2013.01); *H01M 2008/1095* (2013.01); *Y02E 60/50* (2013.01)
USPC .............. 429/514; 429/512; 429/535; 72/352

(58) Field of Classification Search
CPC . H01M 8/0258; H01M 8/026; H01M 8/0263; H01M 8/0265; H01M 8/0247; H01M 8/0254; H01M 8/0202; H01M 8/0204; H01M 8/0206
USPC ...................... 429/512, 518, 514, 535; 72/352
See application file for complete search history.

(56) References Cited

U.S. PATENT DOCUMENTS

| | | | |
|---|---|---|---|
| 2001/0008719 A1 | 7/2001 | Ikeda | |
| 2004/0191704 A1 | 9/2004 | Nishi et al. | |
| 2007/0072045 A1* | 3/2007 | Haufe et al. | 429/35 |
| 2007/0148526 A1* | 6/2007 | Farrington et al. | 429/38 |
| 2009/0011310 A1* | 1/2009 | Trabold et al. | 429/30 |
| 2009/0246586 A1* | 10/2009 | Kawabata et al. | 429/30 |
| 2010/0021791 A1* | 1/2010 | Hawkes et al. | 429/33 |

FOREIGN PATENT DOCUMENTS

| | | |
|---|---|---|
| CN | 1532036 | 9/2004 |
| CN | 101350411 | 1/2009 |
| JP | 2004-265856 | 9/2004 |
| JP | 2004-281146 | 10/2004 |

OTHER PUBLICATIONS

Machine translation of Japanese Patent Document No. JP 2004-265856, published Sep. 24, 2004.*
Chinese Office action, dated Feb. 20, 2013 along with an english translation thereof.
China Office action dated Aug. 2, 2013, along with an english translation thereof.

* cited by examiner

*Primary Examiner* — Milton I Cano
*Assistant Examiner* — Lilia V Nedialkova
(74) *Attorney, Agent, or Firm* — Greenblum & Bernstein, P.L.C.

(57) ABSTRACT

A separator for a fuel cell is provided and may include a plurality of linearly extending protrusions and a plurality of flat walls alternately arranged with the plurality of linearly extending protrusions. Each protrusion is defined by a top wall and a pair of side walls and the linearly extending protrusions are parallel to each other. In addition, a gas passage forming groove is defined between each adjacent pair of linearly extending protrusions, a belt-like groove is provided on an inner surface of each flat wall that faces the corresponding gas passage forming groove, and an inclination angle is set with respect to each flat wall and corresponding side walls.

4 Claims, 5 Drawing Sheets

SEPARATOR FOR FUEL CELL AND MANUFACTURING METHOD OF THE SAME

BACKGROUND OF THE INVENTION

The present invention relates to a separator for a fuel cell that enlarges the cross-sectional area of gas passages and improves the power generation efficiency of the fuel cell, and to a method for manufacturing the separator.

A solid polymer type fuel cell is formed by laminating a plurality of power generating cells, each of which includes a flat plate-like electrode structure (MEA: Membrane Electrode Assembly) and separators on both sides. The electrode structure has a three-layer structure. The electrode structure has a pair of gas diffusion electrodes forming a positive electrode (cathode) and a negative electrode (anode), and an electrolyte membrane between the gas diffusion electrodes. The electrolyte membrane is formed, for example, of an ion-exchange resin. The separators are laminated to contact the gas diffusion electrodes. Gas passages are formed between each separator and the corresponding gas diffusion electrode. In a fuel cell, oxidizing gas such as oxygen or air flows through the gas passages facing the gas diffusion electrode on the positive electrode side (positive electrode layer), and hydrogen gas as fuel flows through the gas passages facing the gas diffusion electrode on the negative electrode side (negative electrode layer). This causes electrochemical reaction to generate electricity.

Japanese Laid-Open Patent Publication No. 2004-265856 discloses a metal separator used in a fuel cell. As shown in FIG. 9, the separator has flat walls 35 and linear protrusions T, which are arranged alternately. Each protrusion T is formed by a pair of side walls 36 and a bottom wall 37. The side walls 36 are bent in relation to the flat wall 35. The inclination angle of each side wall 36 relative to the associated flat wall 35 is expressed by α. A gas passage forming groove 18 is formed between each pair of the protrusions T. Openings 19 of the gas passage forming grooves 18 are closed by a positive electrode layer 14, so that gas passages 20 to correspond to the flat walls 35.

The side walls 36 are inclined relative to the flat walls 35 in order to increase the contact area of the bottom walls 37 with the positive electrode layer 14, so that adequate energization and a sufficient cross-sectional area of the gas passages 20 are ensured. The side walls 36 are inclined through precision coining by a forming apparatus.

Japanese Laid-Open Patent Publication No. 2004-281146 also discloses a separator used in a fuel cell. As shown in FIG. 10, the separator 16 has a plurality of linearly extending protrusions T. A gas passage forming groove 18 is formed between each pair of the protrusions T. The protrusions T contact a positive electrode layer 14 (or a negative electrode layer), so that the passage forming grooves 18 form gas passages 20. Each protrusion T includes a pair of side walls (vertical walls) 36, a pair of overhangs 367, and a bottom wall 37. The side walls 36 extend substantially perpendicularly to the flat walls 35. Each overhang 367 obliquely projects from the upper end of the corresponding side wall 36. Each bottom wall 37 connects the upper ends of adjacent overhangs 367 to each other, and is parallel with the flat walls 35.

However, the separator 16 shown in FIG. 9 has the following drawbacks when being coined. That is, in this case, boundaries 39 between the flat walls 35 and the side walls 36 and boundaries 39 between the side walls 36 and the bottom walls 37 are deformed plastically. Therefore, when the inclination angle α of the side walls 36 relative to the flat walls 35 is less than or equal to 80°, stress concentrates in the boundaries 39. This is likely to cause cracks and fractures. It is therefore difficult to reduce the inclination angle α, while maintaining an adequate thickness of the separator 16 and ensuring sufficient cross-sectional area of the gas passages 20.

In contrast, the separator 16 shown in FIG. 10 can ensure a sufficient contact area of the bottom walls 37 with the positive electrode layer 14 using the overhangs 367. However, as disclosed in paragraphs 0041 to 0073 of the description and FIGS. 7 to 14 of the Japanese Laid-Open Patent Publication No. 2004-281146, the overhangs 367 require a number of steps to form. The formation of the overhangs 367 is significantly burdensome and can increase manufacturing costs.

SUMMARY OF THE INVENTION

Accordingly, it is an objective of the present invention to provide a separator for a fuel cell that increases the area of gas passages, facilitates the process for inclining the side walls relative to the flat walls, and reduces manufacturing costs, and to provide a method for manufacturing the separator.

To achieve the foregoing objective and in accordance with a first aspect of the present invention, a separator for a fuel cell formed by alternately arranging a plurality of linearly extending protrusions and a plurality of flat walls is provided. Each protrusion is formed by a pair of side walls and a top wall. The protrusions are arranged to be parallel with each other. A gas passage forming groove is formed between each adjacent pair of the protrusions. A belt-like groove is formed on the inner surface of each flat wall that faces the corresponding gas passage forming groove. Each belt-like groove is located in a middle position with respect to the widthwise direction of the corresponding flat wall. The belt-like grooves are parallel with the protrusions. By forging the belt-like groove in each flat wall, a thin portion is formed in the flat wall and the width between the corresponding side walls is widened, so that the side walls are inclined relative to the flat wall.

In accordance with a second aspect of the present invention, a method for manufacturing a separator for a fuel cell is provided. The separator is formed by alternately arranging a plurality of linearly extending protrusions and a plurality of flat walls. Each protrusion is formed by a pair of side walls and a top wall. The protrusions are arranged to be parallel with each other. A gas passage forming groove is formed between each adjacent pair of the protrusions. The method includes: a first step for forming the protrusions in a flat plate, each protrusion being formed by a pair of parallel side walls and a top wall; and a second step for pressing a middle portion in the widthwise direction of each flat wall through forging, thereby forming a belt-like groove and a thin portion, wherein, through the forging, the width between the side walls of each flat wall is widened so that the side walls are inclined relative to the flat wall.

In accordance with a third aspect of the present invention, an apparatus for manufacturing a separator for a fuel cell is provided. The separator is formed by alternately arranging a plurality of linearly extending protrusions and a plurality of flat walls. Each protrusion is formed by a pair of side walls and a top wall. The protrusions are arranged to be parallel with each other. A gas passage forming groove is formed between each adjacent pair of the protrusions. The apparatus includes a lower die and an upper die for forming the protrusions in a flat plate. Each protrusion is formed by a pair of parallel side walls and a top wall. The apparatus further includes a forging lower die and a forging upper die for pressing a middle portion in the widthwise direction of each flat wall through forging, thereby forming a belt-like groove and a thin portion. Through the forging, the width between the side walls of each flat wall is widened so that the side walls are inclined relative to the flat wall.

DETAILED DESCRIPTION OF THE PREFERRED EMBODIMENTS

A separator for a fuel cell according to one embodiment of the present invention will now be described with reference to FIGS. 1 to 5.

Figure 5:
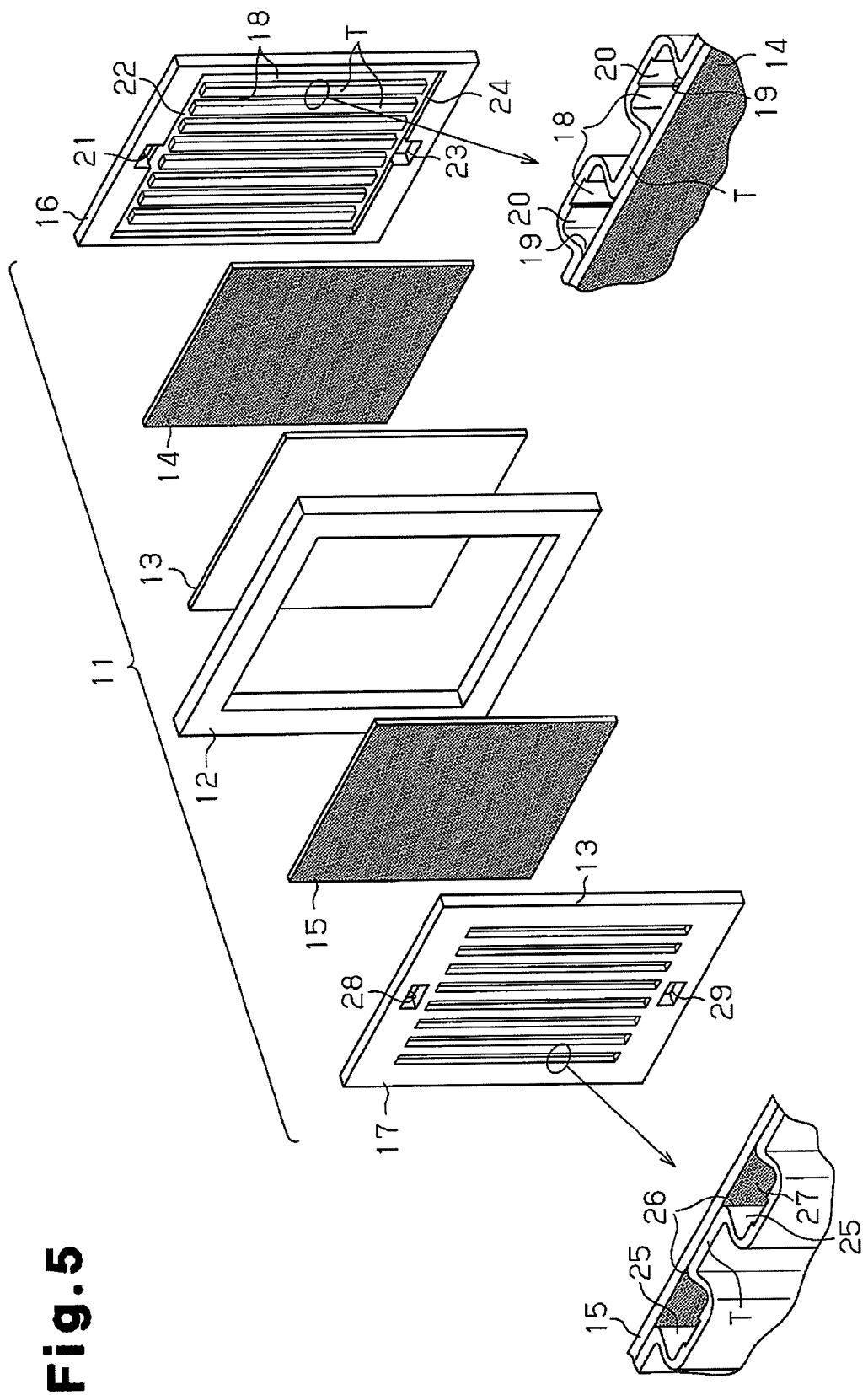
FIG. 5 is an exploded perspective view showing a power generating cell of a fuel cell.

As shown in FIG. 5, a power generating cell 11 of a fuel cell includes a rectangular frame 12. A solid polymer electrolyte membrane 13 is accommodated inside the frame 12. A positive electrode layer 14 and a negative electrode layer 15 are laminated on the surfaces of the solid polymer electrolyte membrane 13. A positive electrode-side separator 16 is arranged on and contacts the surface of the frame 12 and the positive electrode layer 14. A negative electrode-side separator 17 is arranged on and contacts the surface of the frame 12 and the negative electrode layer 15. A plurality of power generating cells 11 are laminated to form a fuel cell stack.

A plurality of oxygen gas passage forming grooves 18 (gas passage forming grooves) are formed on a surface of the positive electrode-side separator 16 that contacts the positive electrode layer 14. The oxygen gas passage forming grooves 18 extend vertically and are parallel with each other. Openings 19 of the oxygen gas passage forming grooves 18 are closed by the positive electrode layer 14. This forms oxygen gas passages 20 in the positive electrode-side separator 16. An oxygen gas supply hole 21 is formed in an upper portion of the separator 16. Oxygen gas drawn in through the oxygen gas supply hole 21 is supplied to the oxygen gas passages 20 through a common gas passage 22. An oxygen gas discharge hole 23 is formed in a lower portion of the separator 16. Oxygen off-gas, which has been used for generating power from the oxygen gas passages 20, flows through a common gas passage 24 and is discharged through the oxygen gas discharge hole 23.

A plurality of fuel gas passage forming grooves 25 (gas passage forming grooves) are formed on a surface of the negative electrode-side separator 17 that contacts the negative electrode layer 15. The fuel gas passage forming grooves 25 extend vertically and are parallel with each other. Openings 26 of the fuel gas passage forming grooves 25 are closed by the negative electrode layer 15. This forms fuel gas passages (gas passages) 27 in the negative electrode-side separator 17. A fuel gas supply hole 28 is formed in an upper portion of the separator 17. Fuel gas drawn in through the fuel gas supply hole 28 is supplied to the fuel gas passages 27 through unillustrated gas passages (refer to the gas passages 22). A fuel gas discharge hole 29 is formed in a lower portion of the separator 17. Fuel off-gas, which has been used for generating power from the fuel gas passages 27, flows through a common unillustrated gas passage (refer to the gas passage 24) and is discharged through the fuel gas discharge hole 29.

Next, the configuration of the separator 16 will be described. Since the separator 17 is identical to the separator 16, the explanation thereof will be omitted. In the following description of the separator 16, the sides of the oxygen gas passage forming grooves 18 (the oxygen gas passages 20) will be referred to as left and right sides, a side facing the positive electrode layer 14 will be referred to as an upper side, and a side opposite to the positive electrode layer 14 will be referred to as a lower side.

Figure 1:
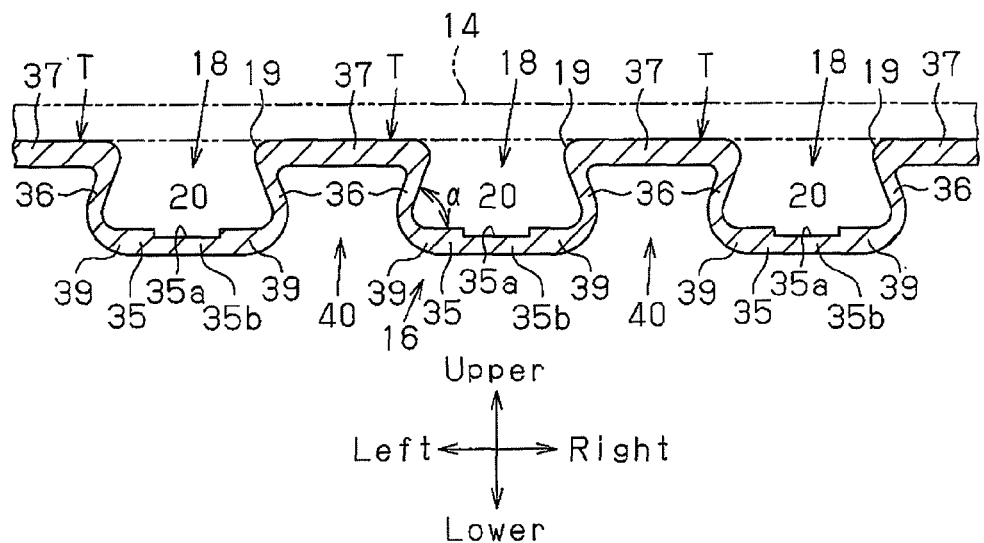
FIG. 1 is a partial cross-sectional view illustrating a separator for a fuel cell according to one embodiment of the present invention.

The separator 16 shown in FIG. 1 is made of stainless steel. The separator 16 is formed by integrating flat walls 35, side walls 36, and top walls 37. The side walls 36 extend from side edges of the flat walls 35. Each top wall 37 extends to connect the upper ends of adjacent side walls 36 to each other. The side walls 36 are inclined relative to the flat wall 35 such that the space between each pair of the side walls 36 decreases toward the upper ends (toward the positive electrode layer 14). The top walls 37 are flat plates and contact the positive electrode layer 14. A plurality of linearly extending protrusions T are formed alternately with the flat walls 35. Each protrusion T is formed by a pair of side walls 36 and a top wall 37. Each adjacent pair of the protrusions T form an oxygen gas passage forming groove 18. The openings 19 of the oxygen gas passage forming grooves 18 are closed by the positive electrode layer 14. This forms the oxygen gas passages 20 from the oxygen gas passage forming grooves 18.

The inclination angle $\alpha$ of the side walls 36 relative to the flat walls 35 is set in a range between 50° and 80°. In the present embodiment, the inclination angle $\alpha$ is set to 70°. The boundaries 39 between each flat wall 35 and the corresponding side walls 36 are formed to be arcuate and bulge outward relative to the corresponding oxygen gas passage forming groove 18. A groove formed below each protrusion T is used as a groove 40 for conducting coolant when the fuel cell generates power.

A belt-like groove 35a is formed in the inner surface of each flat wall 35 that faces the oxygen gas passage forming grooves 18. The belt-like groove 35a is located in the center of the widthwise direction of the flat wall 35. Each belt-like groove 35a forms a thin portion 35b in the center of the associated flat wall 35.

A method for manufacturing the above described separator 16 will now be described. First, a forming apparatus and a forging apparatus used for manufacturing the separator 16 will be described.

Figure 2:
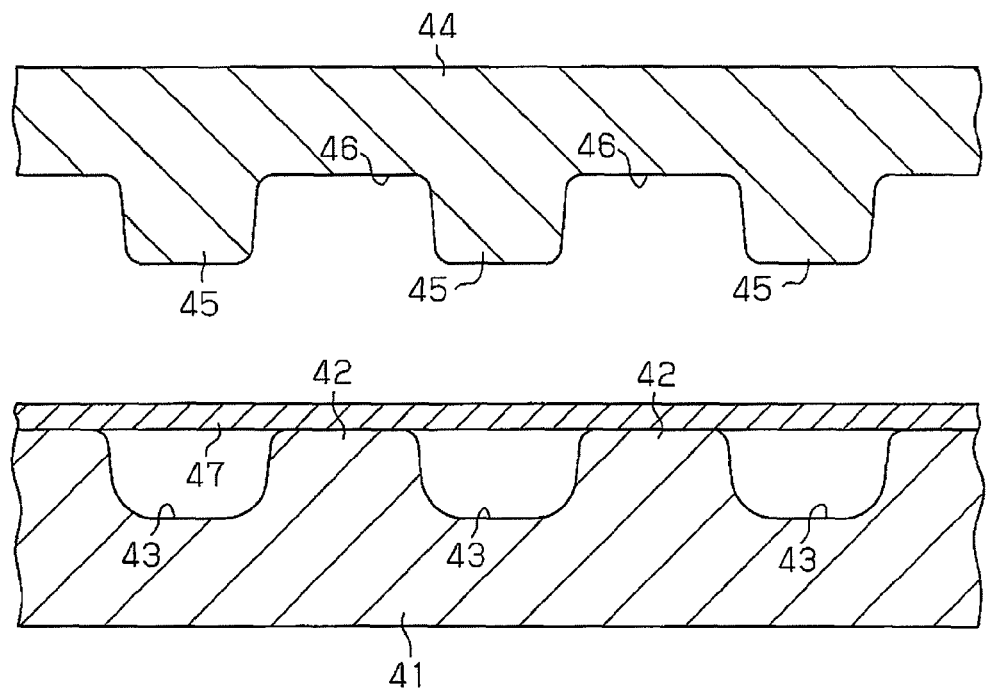
FIG. 2 is a cross-sectional view illustrating a state in which the upper die and the lower die of a forming apparatus for manufacturing a separator for a fuel cell are opened.

As shown in FIG. 2, a plurality of linearly extending protrusions 42 are formed on the upper surface of an lower die 41 of the forming apparatus. Grooves 43 are formed on the upper surface of the lower die 41. Each groove 43 is located between adjacent protrusions 42. A plurality of linearly extending protrusions 45 are formed on the lower surface of an upper die 44 so as to correspond to the grooves 43. A plurality of grooves 46 are formed on the lower surface of the upper die 44. Each groove 46 is located between a pair of protrusions 45, so as to correspond to one of the protrusions 42. The lower die 41 and the upper die 44 simultaneously form all the oxygen gas passage forming grooves 18 of the separator 16 shown in FIG. 5.

Figure 4:
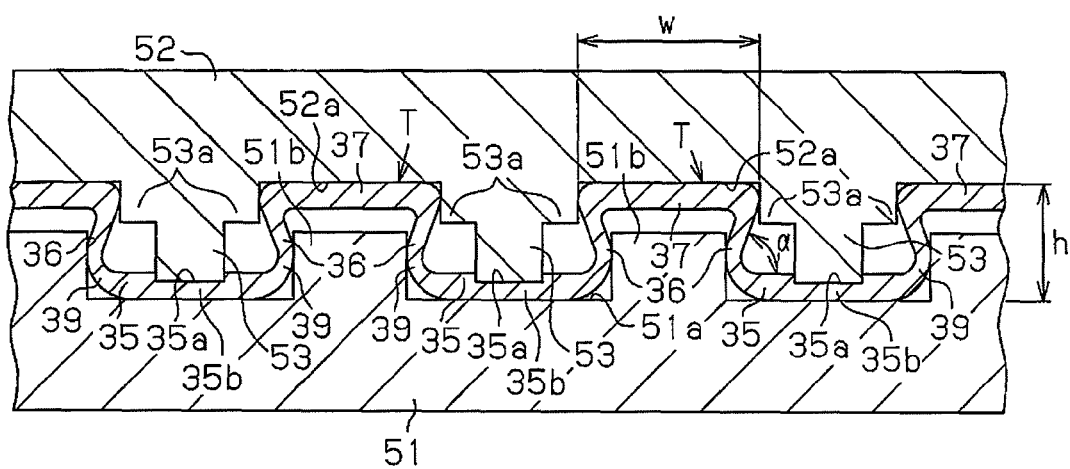
FIG. 4 is a cross-sectional view illustrating a state in which the upper die and the lower die of a forging apparatus are closed.

As shown in FIG. 4, forming surfaces 51a of a lower die 51 of the forging apparatus are formed to be flat. A plurality of linearly extending position determining protrusions 51b are formed alternately with the forming surfaces 51a. The position determining protrusions 51b are provided to determine the positions of the side walls 36. The position determining protrusions 51b are arranged to be parallel with each other. Forming surfaces 52a of the upper die 52 are formed to be flat. A plurality of linearly extending protrusions 53 are formed alternately with the forming surfaces 52a. The protrusions 53 are provided to forge the belt-like grooves 35a and the thin portions 35b on the flat walls 35. Position determining portions 53a for determining the positions of the side edges of the top walls 37 are formed at the proximal ends of protrusions 53. The lower die 51 and the upper die 52 simultaneously form the oxygen gas passage forming grooves 18, the openings 19, the oxygen gas supply hole 21, the oxygen gas discharge hole 23, and the gas passages 22, 24.

A method for forming the above described separator 16 will now be described.

As shown in FIG. 2, a plate 47 is placed on the upper surfaces of the protrusions 42 of the lower die 41 when the lower die 41 and the upper die 44 of the forming apparatus are open. The plate 47 is a flat plate made of stainless steel.

Figure 3:
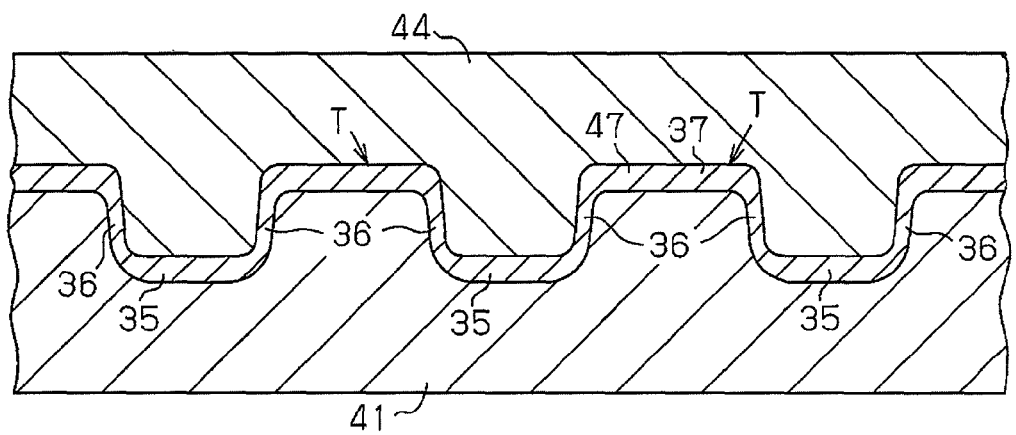
FIG. 3 is a cross-sectional view illustrating a state in which the upper die and the lower die are closed.

Then, as shown in FIG. 3, the upper die 44 is lowered to the lower die 41 and clamped. This forms, in the plate 47, alternately arranged flat walls 35 and protrusions T in a meandering manner. In this state, the side walls 36 are formed to be substantially perpendicular to the flat walls 35.

The separator 16, which has been formed in the above described manner, is sent from the forming apparatus to the forging apparatus. As shown in FIG. 4, the lower die 51 and the upper die 52 forge a belt-like groove 35a and a thin portion 35b in the center in the widthwise direction of each flat wall 35. Specifically, the protrusions 53 of the upper die 52 press the flat walls 35. Accordingly, the pressed part of each flat wall 35 is formed as a belt-like groove 35a and a thin portion 35b. At this time, the thickness of the middle portion of the flat wall 35 is reduced. This deforms the flat wall 35 along the widthwise direction, so that the left edge and the right edge of the flat wall 35 are separated from each other. As a result, the width of the flat wall 35 is increased, and the side walls 36 are inclined relative to the flat wall 35.

The separator for a fuel cell as described above provides the following advantages.

(1) A belt-like groove 35a is formed in the center of each flat wall 35 of the separator 16. The belt-like groove 35a increases the volume of the oxygen gas passage forming groove 18. Accordingly, the flow rate of oxygen gas flowing through the oxygen gas passage 20 is increased, and the power generation efficiency of the fuel cell is thus improved.

Figure 9:
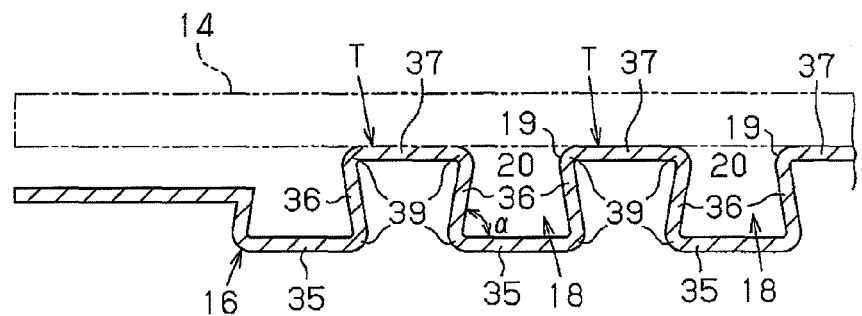
FIG. 9 is a partial cross-sectional view illustrating a prior art separator for a fuel cell.
Figure 10:
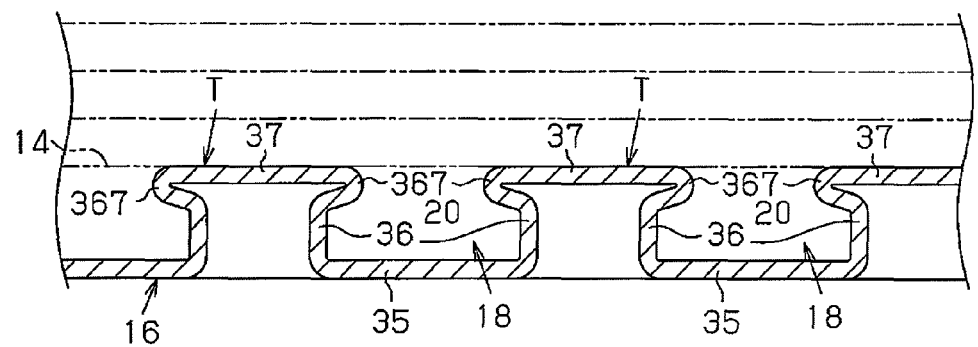
FIG. 10 is a partial cross-sectional view illustrating a prior art separator for a fuel cell.

(2) The lower die 51 and the upper die 52 of the forging apparatus, specifically, the protrusions 53 of the upper die 52, forge a belt-like groove 35a and a thin portions 35b in the center in the widthwise direction of each flat wall 35. In this manner, the protrusions T and the flat walls 35 can be alternately formed such that the width W of each top wall 37 contacting the positive electrode layer 14 and the height h of the side walls 36 (the thickness of the separator 16) are substantially constant. Therefore, compared to the prior art method shown in FIG. 9, the plate 47 is prevented from being cracked, and the width of each flat wall 35 is easily increased, while reducing the stress concentration on the boundaries 39 between each flat wall 35 and the corresponding side walls 36. This allows the inclination angle α of the side walls 36 relative to the flat walls 35 to be easily set in a desired range.

(3) In the power generating cell 11 of the fuel cell, water is generated in the oxygen gas passages 20 when power is generated. According to the present embodiment, the boundaries 39 between each flat wall 35 and the corresponding side wall 36 are formed to be arcuate. Compared to the case of the boundaries of the prior art, which forms an acute angle, water is less likely to collect on the inner surface of the boundaries 39 and is easily drained. Accordingly, the flow rate of oxygen gas flowing through the oxygen gas passage 20 is increased, and the power generation efficiency of the fuel cell is thus improved.

(4) The position determining protrusions 51b are formed on the forming surface 51a of the lower die 51, and the position determining portions 53a are formed on the forming surface 52a of the upper die 52. Thus, the positions of the side walls 36 and the top walls 37 are determined, and the dimensional accuracy is improved.

The above separator for a fuel cell may be modified as follows.

Figure 6:
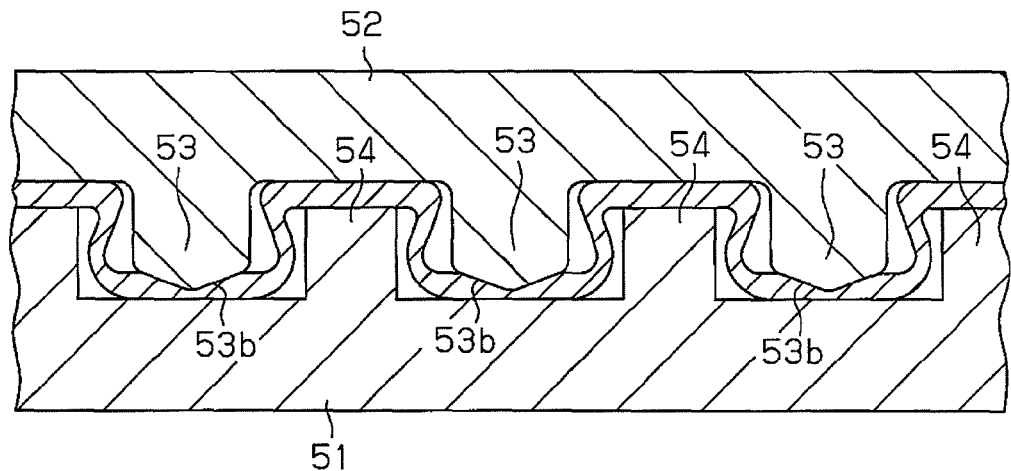
FIG. 6 is a cross-sectional view illustrating a state in which the upper die and the lower die of a forging apparatus for manufacturing a separator for a fuel cell according to a modified embodiment are opened.
Figure 7:
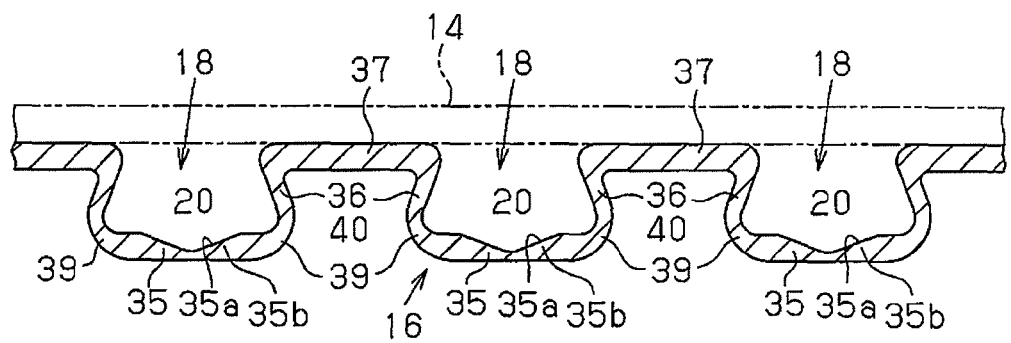
FIG. 7 is a partial cross-sectional view illustrating a separator for a fuel cell according to a modified embodiment.

As shown in FIGS. 6 and 7, the separator 16 may have belt-like grooves 35a having a triangular cross section. Each groove 35a is located in the center in the widthwise direction of a flat wall 35. In this case, the depth of each belt-like groove 35a decreases as the distance from the center in the widthwise direction of the flat wall 35 increases. The forging apparatus for forming the separator 16 has forming surfaces 53b each located at the lower end of a protrusion 53 of the upper die 52. The lower end of each protrusion 53 is formed like a flattened and inverted triangle. In this case, compared to a case where thin portions 35b having an even thickness are forged, the plate 47 can be easily rolled along the widthwise direction of the flat walls 35. Thus, the thin portions 35b can easily forged.

Figure 8:
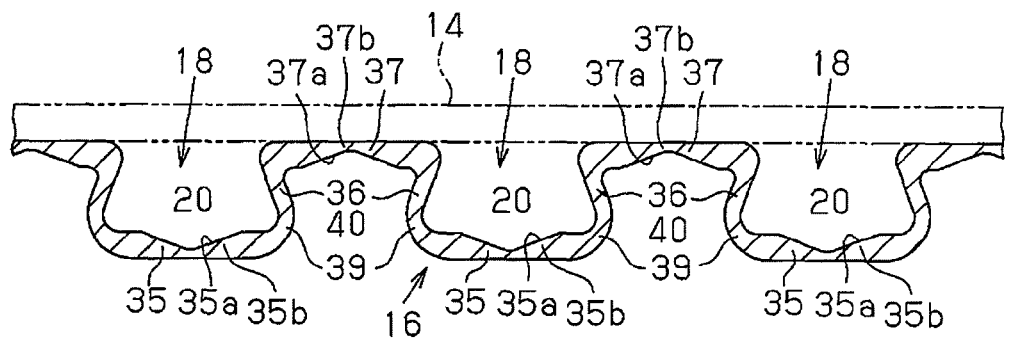
FIG. 8 is a partial cross-sectional view illustrating a separator for a fuel cell according to a modified embodiment.

As shown in FIG. 8, an auxiliary belt-like groove 37a and a thin portion 37b may be formed on a surface of each top wall 37 opposite to the positive electrode layer 14. This structure increases the cross-sectional area of the groove 40 formed inside each protrusion T, and thus improves the cooling efficiency of the fuel cell.

The left and right side edges of each belt-like groove 35a may be formed to be arcuate.

In the process of forging alternately arranged flat walls 35 and the belt-like grooves 35a, a position determining portion may be provided between adjacent protrusions 53 of the upper die 52 shown in FIG. 4. These position determining portions determine the positions of the left and right side edges of the top walls 37.

What is claimed is:
1. A power generating cell comprising:
a rectangular frame;
an electrolyte membrane accommodated inside the frame;
a positive electrode layer and a negative electrode layer provided to contact opposing surfaces of the electrolyte membrane; and
a positive electrode-side separator and a negative electrode-side separator provided to contact opposing surfaces of the frame and the positive and negative electrode layers, respectively, the positive electrode-side separator and the negative electrode-side separator each comprising:
a plurality of linearly extending protrusions; and
a plurality of flat walls alternately arranged with the plurality of linearly extending protrusions, wherein
each protrusion of the plurality of linearly extending protrusions is defined by a pair of side walls and a top wall,
the plurality of linearly extending protrusions are parallel to each other,
a gas passage forming groove is defined between each adjacent pair of the plurality of linearly extending protrusions,
a belt-like groove is provided on an inner surface of each flat wall of the plurality of flat walls that faces the corresponding gas passage forming groove,
each belt-like groove is provided in a middle position with respect to a widthwise direction of the corresponding flat wall,
the belt-like grooves are parallel with the plurality of linearly extending protrusions,
each belt-like groove in each flat wall is a recessed portion in each flat wall, each recessed portion having a thickness that is thinner than a thickness of each flat wall,
a width between corresponding side walls of each protrusion increases toward the top wall so that each side wall is inclined relative to each flat wall,
a fluid supply hole is provided at an upper portion of each of the positive electrode-side separator and the negative electrode-side separator to supply a fluid to each gas passage forming groove through a common fluid supply passage that communicates with each gas passage forming groove,
a fluid discharge hole is provided at a lower portion of each of the positive electrode-side separator and the negative electrode-side separator to discharge the fluid supplied to each gas passage forming groove through a common fluid discharge passage that communicates with each gas passage forming groove,
an auxiliary belt-like groove is provided in a middle portion in a widthwise direction of each top wall,
each auxiliary belt-like groove is parallel with each protrusion, and
each auxiliary belt-like groove in each top wall is a recessed portion in each top wall, each recessed portion having a thickness that is thinner than a thickness of each top wall.

2. The power generating cell according to claim 1, wherein boundaries between each flat wall and the corresponding side walls are arcuate.

3. The power generating cell according to claim 1, wherein each belt-like groove has an inverted triangular cross section, and
a depth of each belt-like groove decreases as a distance from a center of each belt-like groove to side edges of the belt-like groove increases in the widthwise direction of the corresponding flat wall.

4. The power generating cell according to claim 1, wherein an inclination angle of the corresponding side walls to each flat wall is set at 70°.

* * * * *